United States Patent [19]
Juillet

[11] 4,039,103
[45] Aug. 2, 1977

[54] PRESSURIZED DISPENSING CONTAINERS

[76] Inventor: Hubert Juillet, 25 rue Roger-Salengro, 68100 Mulhouse, France

[21] Appl. No.: 533,820

[22] Filed: Dec. 18, 1974

[51] Int. Cl.² .............................................. B65D 35/28
[52] U.S. Cl. .................................................... 222/95
[58] Field of Search .................. 222/92, 95, 94, 215, 222/212, 386.5; 156/245

[56] References Cited

U.S. PATENT DOCUMENTS

| | | | |
|---|---|---|---|
| 3,097,766 | 7/1963 | Biehl et al. | 222/95 X |
| 3,223,289 | 12/1965 | Bouet | 222/95 X |
| 3,380,632 | 4/1968 | Wilson | 222/94 |
| 3,764,433 | 10/1973 | Schneider | 156/245 |
| 3,767,078 | 10/1973 | Gortz et al. | 222/95 X |
| 3,828,977 | 8/1974 | Borchert | 222/95 |
| 3,831,815 | 8/1974 | Glasgow | 222/95 X |

*Primary Examiner*—Robert B. Reeves
*Assistant Examiner*—Norman L. Stack, Jr.
*Attorney, Agent, or Firm*—Raymond A. Robic; Arthur Schwartz; Francis B. Francois

[57] ABSTRACT

In a pressurized dispensing container, the product to be dispensed is separated from a propelling gas by a flexible inner pocket moulded integrally in a single piece of plastic material with a rigid hollow outer body of the container. The pocket may be moulded as a relatively small tubular blank, which is then blown to form the pocket.

5 Claims, 7 Drawing Figures

PRESSURIZED DISPENSING CONTAINERS

The invention relates to containers for dispensing pasty, semi-liquid and similar products, and to methods of manufacturing such containers.

The invention particularly concerns dispensing containers of the type comprising a deformable hollow inner body disposed within a rigid hollow outer body provided with an outlet fitted with a dispensing valve, the deformable inner body containing the product to be dispensed and the space between the outer and inner bodies a gas under pressure, or vice versa, whereby the gas tends to propel the product through the outlet via the valve.

A known dispensing container of this type includes a metal can forming the outer body and a flexible inner bag of plastics material joined together by dudgeoning ("clinching") with a valve or valve supporting cup, the propelling gas being introduced into the container through an orifice in the bottom of the can which is then closed by a rubber bung.

The plastics material bag has very precise characteristics which enable a predetermined regular deformation thereof under the pressure of the gas to dispense all of the product.

These dispensing containers are very simple and of problem-free use.

However, the manufacture thereof is delicate. Moreover, as the can and the pocket are in quite different materials, it is necessary to separately manufacture them before assembly with appropriate fluid-tight sealing joints placed therebetween, and this represents a considerable proportion of the cost price.

An aim of the invention is to remedy or obviate these drawbacks.

According to the invention a container for dispensing pasty, powdery, semi-liquid and similar products comprises a deformable hollow inner body disposed within a rigid hollow outer body provided with an outlet having means for closing the outlet, the inner pocket separating a product to be dispensed from a gas under pressure tending to propel the product through the outlet, in which at least a main part of the deformable inner body is formed in a single integral piece of synthetic plastics material with a main part of the outer body.

Such a dispensing container has multiple advantages, including:
  simplicity of manufacture;
  elimination of sealing joints between the inner and outer bodies, and reduction of the risk of leakage; and
  low cost price compared to a similar container with assembled rigid outer and deformable inner hollow bodies.

The invention also concerns a method of manufacturing such a dispensing container in which a main part of the outer body and the inner body or a blank of the inner body are moulded in a single piece of synthetic plastics material.

The invention will be particularly described, by way of example, with reference to the accompanying drawings, in which.

Figure 1:
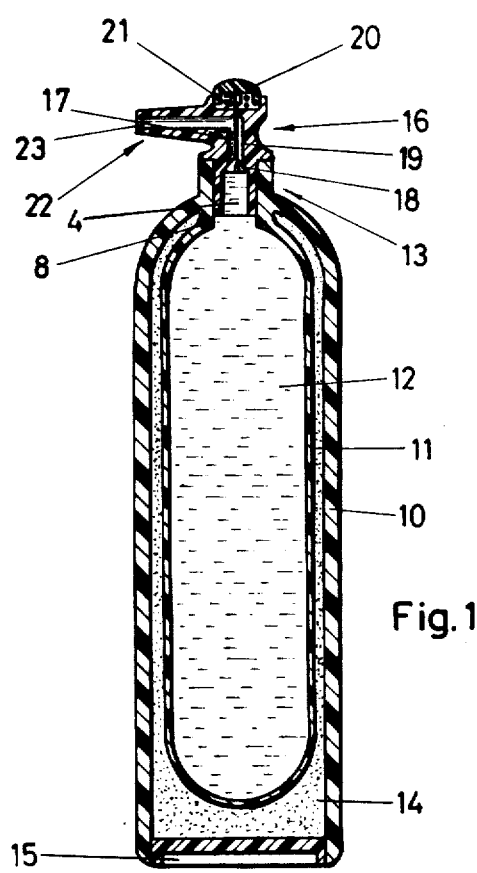
FIG. 1 is an axial cross-section through a first embodiment of dispensing container.

The dispensing container shown in FIGS. 1 to 5 comprises a rigid hollow tubular body 10 in which is disposed a flexible, deformable hollow inner body or pocket 11 containing a pasty product 12 to be distributed.

The rigid outer body 10 and flexible pocket 11 are in a single integral piece of synthetic plastics material, for example polypropylene.

The upper part of body 10 has, adjacent the junction with pocket 11, a narrow neck 13 with an aperture which communicates with the inside of pocket 11. The lower end of body 10 is fluid-tightly closed by a tightly fitted capsule 15. In the outlet aperture of neck 13 is fluid-tightly force fitted a known type of dispensing head 16 including a valve 17 carrying a clapper 18 extended upwardly by a control rod 19 provided with a push-button 20 which is upwardly biased by a spring 21. Head 16 also includes a nozzle 22 having an outlet passage 23 communicating with the aperture of neck 13.

The space 14 left between the body 10 of the container and pocket 11 is filled with a compressed gas, for example air, which exerts a pressure on pocket 11 to tend to propel the product 12 through the valve 17 and passage 23.

Figure 2:
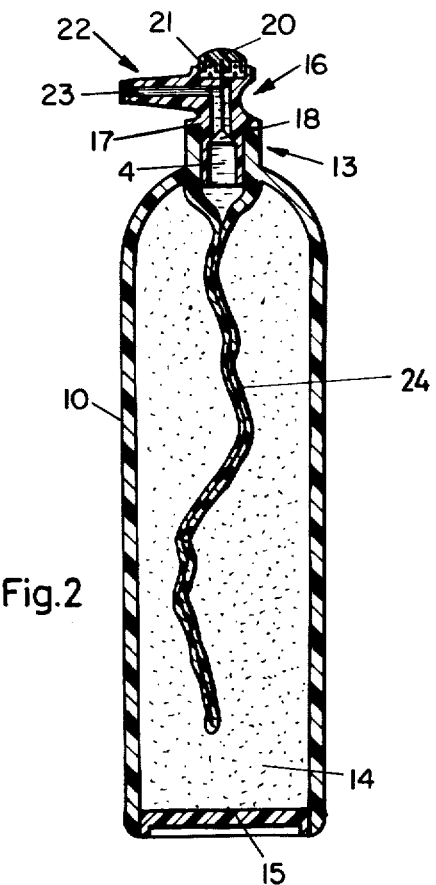
FIG. 2 is a similar view to FIG. 1 but after distribution of all of the product.

When all or substantially all of the product 12 has been dispensed by opening the valve 17, the pocket 11 is compressed to the form of a double membrane 24, FIG. 2.

Figure 3:
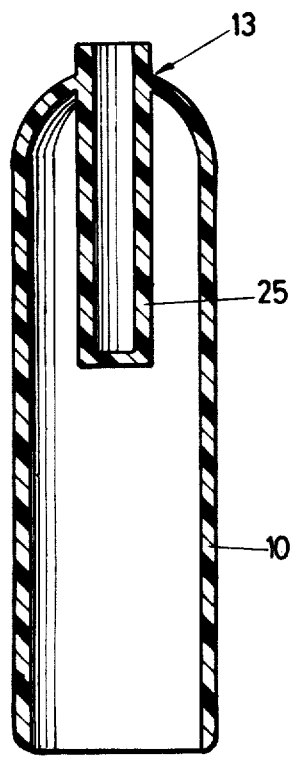
FIGS. 3 to 5 are axial cross-sections illustrating different stages during manufacture of the container of FIGS. 1 and 2.
Figure 4:
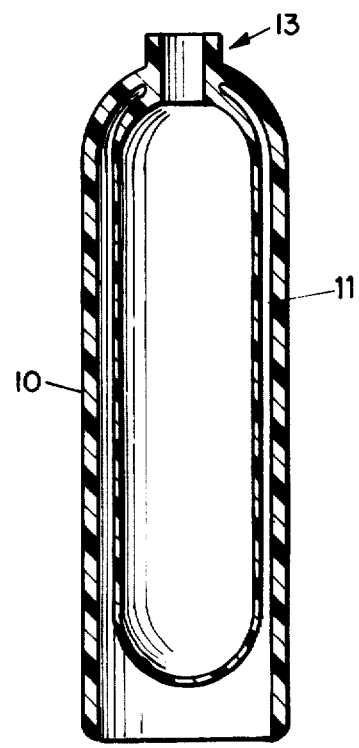
Figure 5:
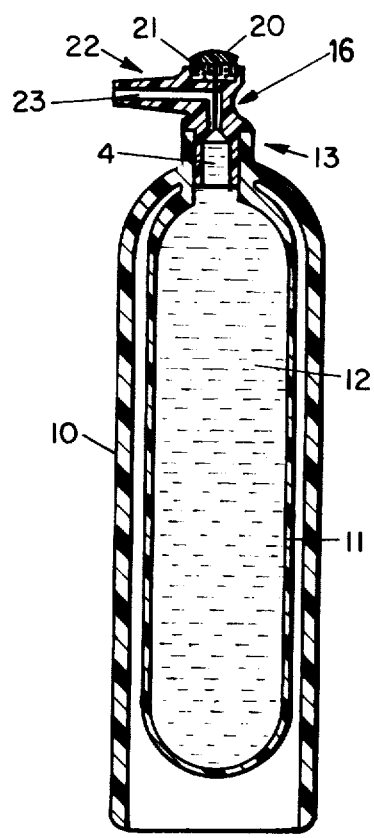

The dispensing container of FIGS. 1 and 2 is advantageously manufactured by the following method, as illustrated by FIGS. 3 to 5.

Firstly, as shown in FIG. 3, the body 10 including neck 13 is moulded simultaneously and in a single piece with a relatively small cylindrical tube 25 opening at its upper end into neck 13 and closed at its lower end, using a press for the injection moulding of plastics materials, this tube 25 forming a blank of the finished pocket 11.

The blank-forming tube 25 is then heated and blown until its walls become sufficiently thin and flexible to form the pocket 11, as shown in FIG. 4.

Then, the pocket to be dispensed is injected into the thus-formed pocket 11 and the dispensing head 16 is fitted, as shown in FIG. 5.

Finally, the space 14 is filled with compressed gas and simultaneously the bottom end of body 10 is obturated by tightly fitting capsule 15, to provide the completed container as shown in FIG. 1.

As a variation, the blank-forming tube 25 can be blown immediately after moulding while the material is still warm, after withdrawal of the male part of the mould defining the shape of the inner face of body 10 and the outer face of tube 25.

It is also possible to draw or otherwise mechanically act on the pocket blank to facilitate the blowing.

Figure 6:
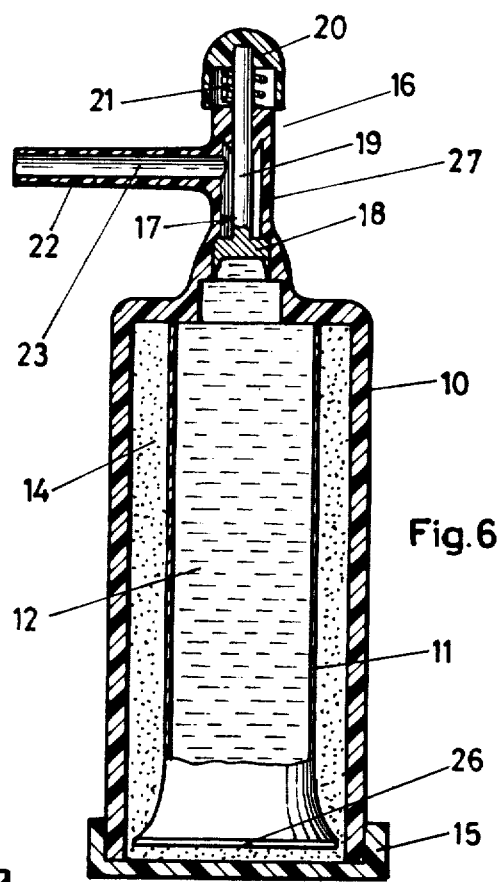
FIG. 6 is an axial cross-section of a second embodiment of dispensing container.
Figure 7:
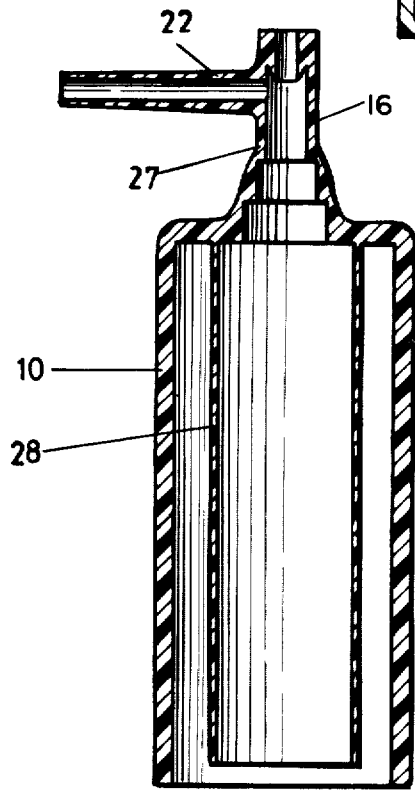
FIG. 7 is a view similar to FIG. 6 of a stage of manufacture of the container.

FIGS. 6 and 7 show another dispensing container, the same reference numerals being used to designate the same or equivalent elements. In this container, the lower end of pocket 11 is formed as a flat weld line 26. Also, the main part of the body of the distribution head 16, namely nozzle 22 and a body 27 of valve 17, is in a single integral piece with body 10 and pocket 11. Another difference with the first embodiment is that capsule 15 is fitted outside the end of body 10, instead of inside.

The second embodiment of dispensing container is advantageously manufactured as follows.

Firstly, using an injection press for moulding synthetic plastics materials, the body 10, a pocket blank in the form of a sleeve 28 open at its lower end and opening at its upper end into neck 13, the neck 13, valve housing 27 and nozzle 22 are simultaneously moulded in a single piece, as shown in FIG. 7.

The clapper 18 and push rod 19 of the valve are then inserted through the open lower end of sleeve 28 and placed in the valve housing 27. Spring 21 is placed about rod 19, and the push button 20 is then force fitted on the upper end of rod 19.

The edges of the lower open end of sleeve 28 are then placed together and welded along weld line 26 to form the pocket 11.

Next, the product 12 to be dispensed is introduced into pocket 11 via nozzle 22 with the valve 17 open. The space 14 is then filled with pressurized gas and the capsule 15 tightly fitted on.

Of course, various modifications or variations may be made to the described and illustrated dispensing containers, and their methods of manufacture. In particular:

The propelling gas could be in the pocket 11 and the product to be dispensed in the space 14.

the capsule 15 may be in plastics materials and welded on e.g. by ultrasound, high-frequency or by the application of heat, or may be force fitted, clipped on, screwed, cemented, or otherwise secured.

fitting of the capsule 15 may be carried out in a pressurised enclosure.

several inner pockets may be provided connected to several dispensing nozzles or to the same nozzle to provide a mixture at the moment of dispensing.

several dispensing containers may be simultaneously moulded side-by-side in a single piece but detachable from one another.

metallic inserts may be embedded during moulding or fitted later.

the outlet of the container may initially be closed by a frangible membrane, the neck being adapted to screwably or force-fittably receive a dispensing head including means for rupturing the membrane during fitting of the head.

in the first method of manufacture described with reference to FIGS. 3 to 5, the pocket blank 25 could have an open bottom end; in certain cases, this may improve centering during moulding. This open end would then be closed, for example by placing its periphery edge-to-edge and welding, to enable blowing of the pocket.

in the second method of manufacture described with reference to FIG. 7, the sleeve 28 could already be closed at its lower end during moulding, or immediately after moulding while the material is still hot, and the dispensing head fitted through the open upper end.

Also, in order to prevent diffusion of the product into the gas by osmosis through the wall of pocket 11, it is possible to include in the initially injected pressurized gas a component of the product. For example, in the case of an industrial product in a solvent, a small quantity of the same solvent or a solvent from the same family can be added to the gas. For an aqueous product such as toothpaste, a given quantity of water may be included in the pressurized gas. In this manner, drying or other alteration of the product and the unwanted consequences can be avoided.

Various types of dispensing heads can be used, for example including a shaping nozzle, a tap for adjusting the amount dispensed, brushes of various types (tooth or shoe brushes), application pads, seringues, multiple valves for dispensing several products simultaneously or together, or a ball-point for use as a pen.

The containers can be used for dispensing various products including: food (mustard, honey, fresh cream, mayonnaise, ketchup, salt and so on); cosmetics (lacquer, brilliantine, creams, pomades, make-up, nail varnish and so on); industrial products (mastics, greases, adhesives with one or more components, and so on); pharmaceutical products (liquid for intraveinous and intramuscular injection, ointments, powdered penicillin, toothpaste, talcum powder and so on; and refills (writing ink, lighter gas and so on). Generally speaking, such products may have any substantially non-elastic flowable physical state including liquid, semi-liquid, pasty and powdery.

The described dispensing containers are of reliable operation in all directions and in all conditions.

The embodiments of the invention in which an exclusive property or privilege is claimed are defined as follows:

1. A container for dispensing pasty, powdery, semi-liquid and similar products, comprising:
   a. a rigid hollow outer body, including an end wall, and a generally cylindrical, relatively non-crushable sidewall open at its outer end, said end wall having outlet means integrally formed thereon and which includes a valve housing;
   b. a deformable hollow inner body disposed within said rigid hollow outer body, said inner body being formed in a single integral piece of synthetic plastic material with said end wall of said outer body in surrounding relation to said outlet means, said sidewall of said outer body also being formed of said single integral piece of synthetic plastic material and being substantially thicker than said inner body whereby it is relatively non-crushable with respect to said inner body;
   c. valve means received within said valve housing for controlling flow from said hollow inner body; and
   d. capsule means sealing the outer end of said cylindrical sidewall of said outer body,
   e. the inner body containing a product to be dispensed, and the space between said inner body and said outer body containing a gas under pressure tending to propel the product through the outlet.

2. A method of manufacturing a container for dispensing pasty, powdery, semi-liquid and similar products, of the type comprising a deformable hollow inner body disposed within a rigid hollow outer body provided with an outlet having means for closing the outlet, the inner body separating a product to be dispensed from a gas under pressure tending to propel the product through the outlet, said method comprising:
   a. moulding a rigid hollow outer body from a single integral piece of synthetic plastic material, said rigid hollow outer body being moulded with an end wall and a generally cylindrical sidewall; and
   b. simultaneously moulding a deformable inner hollow body from said single integral piece of synthetic plastic material, whereby said inner hollow body is integrally formed with a main portion of said rigid hollow outer body, said moulding of the deformable inner hollow body comprising the steps of:
  a. forming a tubular bland integral with said end wall of said rigid outer body; and
  b. blowing said tubular blank while such is hot to complete formation of said inner hollow body.

3. A method of manufacturing a container as recited in claim 2, wherein the moulding piece is first allowed to cool with the tubular blank formed thereon, and thereafter the tubular blank is heated and blown.

4. A method of manufacturing a container as recited in claim 2, wherein the tubular blank is blown shortly after moulding while the material is still hot.

5. A method of manufacturing a container as recited in claim 2, wherein the tubular blank has one end thereof open through said end wall of said rigid hollow outer body, and the other end thereof is also formed open.

* * * * *